Nov. 3, 1953  B. GROSVENOR  2,657,791
SPECTACLE CASE
Filed Dec. 7, 1950
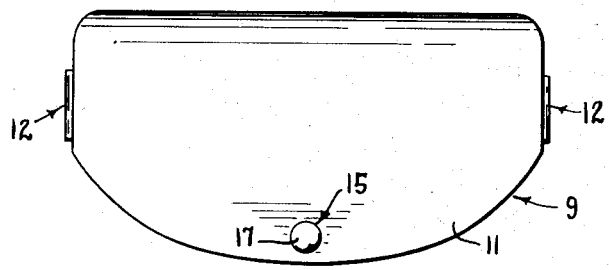
Fig. 1
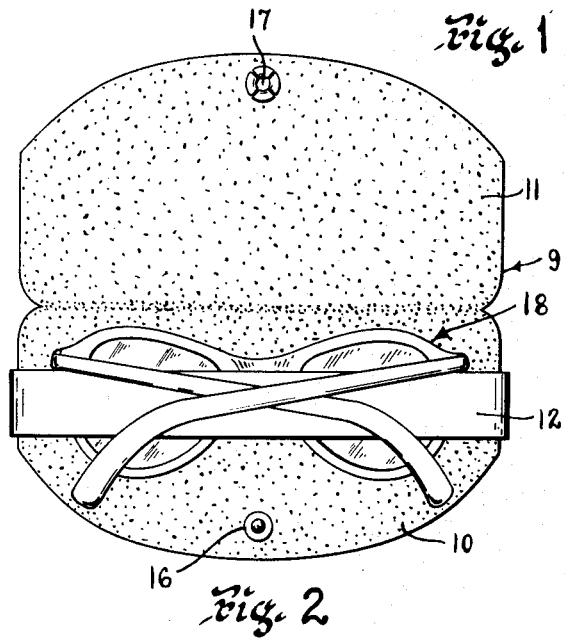
Fig. 2
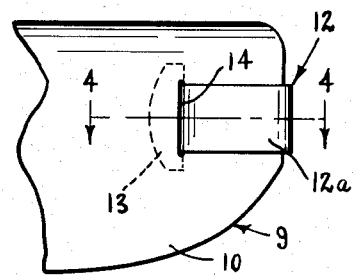
Fig. 3
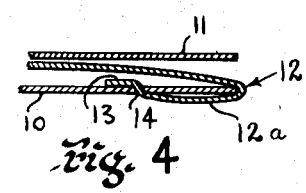
Fig. 4
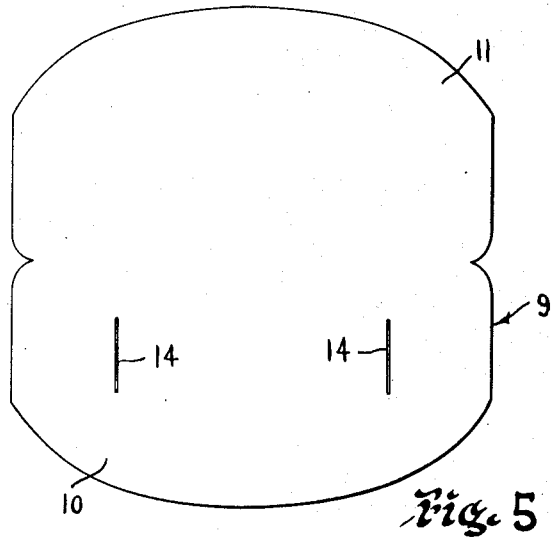
Fig. 5
Fig. 6
INVENTOR
BENJAMIN GROSVENOR
BY
Louis L. Gagnon
ATTORNEY Patented Nov. 3, 1953

2,657,791

UNITED STATES PATENT OFFICE 2,657,791

SPECTACLE CASE

Benjamin Grosvenor, Pomfret, Conn., assignor to American Optical Company, Southbridge, Mass., a voluntary association of Massachusetts Application December 7, 1950, Serial No. 199,590

1 Claim. (Cl. 206—5)

This invention relates to spectacle cases and has particular reference to cases of the type formed of flexible sheet material arranged so as to provide a receptacle for spectacles, and method of making same.

An important object of the invention is to provide an improved spectacle case formed of leather, fabric, plastic or other suitable flexible sheet material which can be initially shaped as a blank which may be stamped or otherwise cut out of the desired sheet material, and assembled with separate flexible retaining means so as to form a receptacle for carrying spectacles or like articles.

Another object is to provide a spectacle case of the above character which comprises a body of sheet material cut to the desired size and shape and folded so as to present joined front and back portions, said back portion embodying retaining means for attachment of a separate elongated flexible retaining member, which member extends transversely of the inner surface and around the ends of said back portion, with portions thereof overlying portions of the outer surface of said back portion, the ends of said member being secured to said retaining means and thereby forming means for retaining spectacles or like articles in position within the case.

Another object is to provide a spectacle case of the above character wherein said body element is of a selected material and of a preferred color and has secured thereto the flexible retaining member which may be of contrasting material and/or color, said body portion being further provided with fastening means for securing the front and back portions thereof together, said fastening means also being provided in contrasting colors and materials if desired for decorative purposes.

Another object is to provide a spectacle case of the above character which can be formed of sheet material so shaped as to require the use of a minimum amount of material and adapted to be manufactured at relatively low cost.

Other objects and advantages will become apparent from the following description taken in connection with the accompanying drawing, in which:

Fig. 1 is a front elevational view of a spectacle case embodying the present invention;

Fig. 2 is a front elevational view of the spectacle case opened to disclose the means for supporting spectacles therein;

Fig. 3 is a fragmentary rear elevational view of the device illustrated in Fig. 1;

Fig. 4 is a fragmentary sectional view taken on line 4—4 of Fig. 3 and looking in the direction of the arrows;

Fig. 5 is a plan view of the blank from which the body portion is formed; and

Fig. 6 is a fragmentary plan view of the retaining member.

In the manufacture of flexible spectacle cases for sale in the low priced field, it has been customary to assemble such cases by stitching, cementing or similar methods involving a considerable amount of labor and thereby resulting in increased cost of the product. It has been found, however, that such methods of assembly are not always satisfactory since over periods of time, particularly under severe conditions of wear, the stitches or cement may deteriorate thereby allowing the assembled portions of said case to become disconnected and thereby permitting the spectacles or other contents of the case to become lost or damaged. The present invention overcomes the above objections through elimination of some of the additional labor and cost incurred by such methods of assembly by providing a compact, durable and attractive flexible case consisting of a one-piece body element arranged to form a receptacle for spectacles or the like. To said body element is attached retaining means preferably in the form of an elongated band of flexible material, said band extending transversely of the inner surface and around the ends of the rear portion of said body element and overlying a portion of the outer surface of said rear portion of the body element, the ends of said band being detachably secured to said rear portion of the body element by simple and efficient means, said body element being further provided with fastening means for securing the folded portions thereof in closed relationship, thereby providing a receptacle for retaining spectacles or similar articles and protecting said articles from possible damage when not in use.

Referring more particularly to the drawing wherein like characters of reference designate like parts throughout the several views, the embodiment of the invention as shown in Figs. 1 and 2 comprises a one-piece body element shaped substantially to the shape illustrated in Fig. 5 and formed as a blank 9 which may be stamped or otherwise cut out of flexible sheet material of the selected type such as leather, fabric, plastic or the like. The blank 9 consists of a back panel portion 10 and a front panel portion 11, which when folded into overlying relation with one another as shown in Fig. 1 will be seen as being of substantially the same contour shape and size.

An elongated band or retaining member 12 (Fig. 6) also formed as a blank which may be stamped or otherwise cut out of flexible sheet material of the type desired such as leather, fabric, plastic or the like, and is adapted to extend transversely across the inner surface of the back panel portion 10 (Figs. 3 and 4), and around the ends thereof, and has portions 12a overlying the outer surface of said back panel portion 10. The extreme ends of the band 12 are extended through vertically disposed slits 14 formed in the back panel portion 10 and are provided with enlarged end portions 13 adapted, when the band is in assembled relation with the body portion 9, to overlie the inner surface of the back panel portion 10 beneath the major transversely extending portion of the band. The slits 14 are substantially shorter than the width of the end portions 13 of the band 12 so that the band 12 is held securely in place. The end portions 13 may be shaped in various manners, the important factor being to maintain the enlarged end portions 13 of a width greater than the length of the slit 14. Such means provides for detachably securing the strap 12 to the rear panel portion 10 of the body element so that the bands 12 may be interchangeable if desired.

A snap fastener 15 (Fig. 1) such as the type embodying cooperative male and female elements serves to retain the front panel portion 11 in attached relation with the rear panel portion 10. The male element 16 of the snap fastener 15 is preferably secured in the conventional manner to the rear panel portion 10 with the female element 17 being mounted on the front panel portion 11 and being adapted to cooperate with the male element 16 to position the front panel portion 11 in secured overlying relation with said rear panel portion 10.

Spectacles or other articles to be carried in the case are positioned between the transversely extending portion of the band 12 and the rear panel portion 10 as shown in Fig. 2, and the front panel portion is adapted to be brought down into overlying relation therewith, to seal the upper edge of the case, and to be secured to the rear panel portion 10 by the fastener 15, thus sealing the lower edge of the case. The article being carried in the case is prevented from sliding out of the ends thereof by the portions of the band 12 which extend around the ends of the rear panel portion 10.

When carrying spectacles in the case, for which purpose the case is particularly well adapted, the front or lens carrying portion of the spectacle frame is inserted between the elongated retaining band 12 and the inner surface of the back panel portion 10 (Fig. 2) with the temple members of the frame resting on the upper edge of the band 12, with the depending portions thereof overlying the front surface of the band. This serves to locate and hold the spectacle in its proper location in the spectacle case. The front panel portion 11 is next folded down and secured to the rear panel portion 10, thereby providing efficient, safe, compact and durable means for carrying spectacles or similar articles.

In producing a spectacle case in accordance with the construction illustrated, the body element 9 will be preferably initially stamped from the selected flexible sheet material and the slits 14 will preferably be formed simultaneously with the blanking operation. The retaining band 12 may be formed of a material and color similar to the body element 9 or, if desired, it may be formed of a different material, such for example, as by forming it of a light metallic or plastic material which would impart some rigidity to the assembled structure. Another desirable feature is that the retaining band 12 and the snap fastener 15 may be provided in colors contrasting with the color of the body element, which will increase the decorative effect and enhance the appearance of the final product.

The foregoing specification describes an improved spectacle case formed of sheet material having its related portions retained in position with respect to one another by simple and efficient detachable connecting means, which connecting means provides reinforcing means for the case as well as decorative effect therefor.

It will be seen that simple and efficient means and method have been provided in accordance with the objects set forth hereinabove. While the novel features of the invention have been described and are pointed out in the annexed claim, it will be understood that various omissions, substitutions and changes in the forms and details illustrated and described may be made by those skilled in the art without departing from the spirit of the invention. I, therefore, do not wish to be limited to the exact details described as the preferred only are set forth by way of illustrations.

I claim:

A two-piece stitchless spectacle case comprising a one-piece body of flexible non-metallic sheet stock folded along a transverse line to form a pair of panels each of which has a length and a width greater than that of the spectacles to be positioned therebetween, one of said panels having a pair of spaced slits angularly disposed to said transverse line of fold, and a separate strap member of similar flexible sheet stock overlying the inner surface of said panel having the spaced slits, said strap member having its opposed longitudinal edges free and its end portions extended around the opposed side edges of said slitted panel so as to overlie the outer surface of said panel adjacent said opposed side edges and terminating in enlarged ends which are extended through the respective slits to lie on the inner surface of said panel beneath the intermediate portion of said strap member, said strap member, when in secured relation with the panel, having an effective length sufficient to permit spectacles to be inserted and snugly fit between said intermediate portion and the panel and with the temples thereof overlying the strap member, said strap member further having a width less than the width of the panel but sufficiently wide so that when said spectacles are slipped between the intermediate portion of the strap member and the inner surface of the panel the major portion of the lens areas of the spectacles will be covered thereby, said slits being only slightly longer than the width of said strap member and less than that of the enlarged ends whereby the enlarged ends will maintain the strap member in readily detachable but positive assembly with the said panel and prevent the spectacles from slipping sidewise out of the case, and connection means carried by said two panels adjacent their sides opposed to the transverse line of fold and by which the two panels may be detachably connected together to complete the securing of the spectacles therein.

BENJAMIN GROSVENOR.

References Cited in the file of this patent

UNITED STATES PATENTS

| Number | Name | Date |
|---|---|---|
| 1,703,139 | Falcone | Feb. 26, 1929 |
| 2,188,813 | King | Jan. 30, 1940 |
| 2,277,371 | Simpson | Mar. 24, 1942 |
| 2,397,366 | Ogden | Mar. 26, 1946 |
| 2,443,256 | Lebold | June 15, 1948 |
| 2,547,620 | Capano | Apr. 3, 1951 |

FOREIGN PATENTS

| Number | Country | Date |
|---|---|---|
| 1,379 | Great Britain | 1908 |
| 199,846 | Great Britain | July 5, 1923 |